United States Patent [19]

Higgins et al.

[11] 4,370,372

[45] Jan. 25, 1983

[54] METHOD OF JOINING HONEYCOMB PANELS USING A FASTENER ELEMENT

[75] Inventors: William E. Higgins, Largo; Richard C. Lazzara, St. Petersburg, both of Fla.

[73] Assignee: Advanced Technology & Research, Inc., Largo, Fla.

[21] Appl. No.: 248,894

[22] Filed: Mar. 30, 1981

[51] Int. Cl.³ .......................... B32B 3/12; B32B 7/08
[52] U.S. Cl. ...................................... 428/116; 52/785; 156/91; 156/256; 411/23; 428/117; 428/223
[58] Field of Search .................... 156/91, 256; 411/23; 428/116, 117, 223; 52/785

[56] References Cited

U.S. PATENT DOCUMENTS

| 4,076,877 | 2/1978 | Tanzen | 428/117 X |
| 4,224,971 | 9/1980 | Müller et al. | 156/91 X |
| 4,242,158 | 12/1980 | Olson | 156/92 |
| 4,265,688 | 5/1981 | Gorski | 156/91 X |

FOREIGN PATENT DOCUMENTS 661111  11/1951  United Kingdom ................ 411/23

Primary Examiner—Caleb Weston
Assistant Examiner—Robert A. Dawson
Attorney, Agent, or Firm—LeBlanc, Nolan, Shur & Nies

[57] ABSTRACT

A method of joining together two composite honeycomb panels each having internal cellular structure wherein related bores are formed in the respective panels with at least one of said bores extending entirely through its panel, the panels are placed in tightly abutting relation with the bores in alignment, a hollow tubular fastener is inserted through the one bore to project into and along the aligned bores, and fluent anchoring glue type adhesive is forced into the fastener so that some of the adhesive extrudes from within the fastener through side apertures to randomly occupy adjacent space in the cellular structures of both panels, and the anchoring adhesive is hardened in situ; and the resultant coupled panel assembly.

9 Claims, 8 Drawing Figures

METHOD OF JOINING HONEYCOMB PANELS USING A FASTENER ELEMENT

This invention relates to the coupling of honeycomb panels and is particularly concerned with special fastener construction and modes of fastening for permanently attaching panels of honeycomb structure together.

The invention faces the problem of attaching together two or more lightweight honeycomb panels for fabricating box-like receptacles, furniture, lockers and other items to be used on boats, airplanes, mobile home vehicles and the like and in any location where weight is a factor.

These honeycomb panels are of known construction each having a cellular core sandwiched between impermeable cover sheets, and the problem is to provide fastening between two abutting panels that will anchor in the cellular core structure, and that is a major object of the invention.

It is a further object of the invention to provide a novel method of assembly and the resultant structure wherein aligned bores are formed in the cellular cores of abutting panels to be secured together, special hollow fluid distribution anchoring fasteners are inserted to extend into both aligned bores, and an anchoring fluid capable of hardening in situ in the core structure is forced into the fasteners to fill the fasteners and be distributed into the cellular core portions surrounding the inserted fasteners.

Another object of the invention is to provide a novel coupling between abutting angularly disposed honeycomb panels wherein a hollow side wall apertured fastener tube having a flared opening at its outer end is inserted into aligned bores in the panels where it extends through ruptured cell wall regions of both panels, and a fluid anchoring plastic, which is preferably an adhesive capable of hardening in situ, is forced through the open end of the fastener to fill the fastener and discharge through the apertures in the fastener side wall to occupy cell regions around and at the inner end of the fastener, the hardened fluid combining with the fastener tube to permanently interlock the panels in assembly.

A further object of the invention is to provide a novel flared end fastener tube having a multiplicity of side wall openings.

Further novel features and other objects of this invention will become apparent from the following detailed description, discussion and the appended claims taken in conjunction with the accompanying drawings.

PREFERRED EMBODIMENTS

As will be described in the preferred embodiment two lightweight honeycomb panels 11 and 12 are secured together at right angles with a flat edge of one panel in abutment with a flat surface of the other, rigidly and permanently.

Each panel is of known honeycomb panel construction, comprising a cellular core 13 consisting of side by side similar parallel cells 14, here about 3/16" in diameter, sandwiched between stiff parallel cover sheets 15 and 16 of moisture impervious material. The core may be of a thin paper-like material coated with shellac and defining thin hexagonal cell walls, as shown; and the cover sheets may be quite thin hard sheets of woven or non-woven fiberglass bonded in a suitable stiffening resin or a similar inert fibrous material, adhesively or equivalently secured across the opposite ends of all of the core cells to effectively close the cells.

A composite panel of the foregoing type may be about one-half inch in total thickness and although lightweight it is surprisingly resistant to bending. It is resistant to corrosion, and provides a desirable material for making boxes, furniture lockers and other items used on boats, airplanes and vehicles where weight is a factor.

Figure 6:
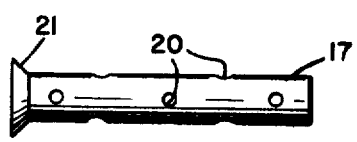
FIGS. 6, 7 and 8 are side elevations, end and longitudinal sectional views showing the hollow fasteners of the foregoing Figures.
Figure 7:
Figure 8:
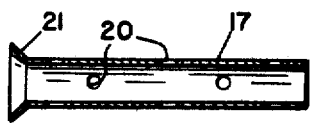

The first step is to form coacting bores in the respective panels located to receive fastener elements, for example the tubular element 17, shown in detail in FIGS. 6–8. Thus a bore 18 is formed through panel 11 at right angles to the plane of the panel, and an associated bore 19 is formed through panel 12 parallel to the plane of that panel and perpendicular to the panel edge abutting panel 11.

These bores are of the same diameter preferably and slightly larger than the diameter of fastener 17 to allow for ready slidable insertion of the fastener and to ensure adequate space for some of the anchoring medium to surround the tube externally as will appear. The outer end of the bore 18 is preferably chamfered as at 19 and the fastener tube has a flared outer end 21 to limit insertion of the fastener and terminate substantially flush with the outer surface of panel 11.

A typical fastener 17 is a relatively rigid aluminum tube about two inches long having a uniform diameter of about 5/16" except at the flared end, and formed with a series of longitudinally and peripherally spaced apertures 20 about 3/32" in diameter. In some embodiments the fastener may be a stiff plastic tube.

Figure 4:
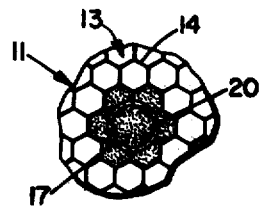
FIG. 4 is a view in section showing disposition of each hollow fastener relative to the adjacent cells of the honeycomb structure, this view being taken in the direction of the length of the cells substantially on line 4—4 of FIG. 1.
Figure 5:
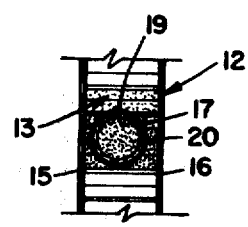
FIG. 5 is a view mainly in section showing disposition of the hollow fastener relative to the cells of the honeycomb structure, this view being at about right angles to FIG. 4 and substantially on line 5—5 of FIG. 3.

The diameter of the fastener is greater than the diameter of a cell 14 so that when the bores 18 and 19 are formed, as by a drilling operation, a number of cell walls will be ruptured in regions surrounding the bores and the fastener in both panels. For example see FIG. 4 where the fastener bore is shown as rupturing six cell walls in panel 11, and FIG. 5 where the fastener bore ruptures cell walls in at least two adjacent rows of cells of panel 12.

Figure 1:
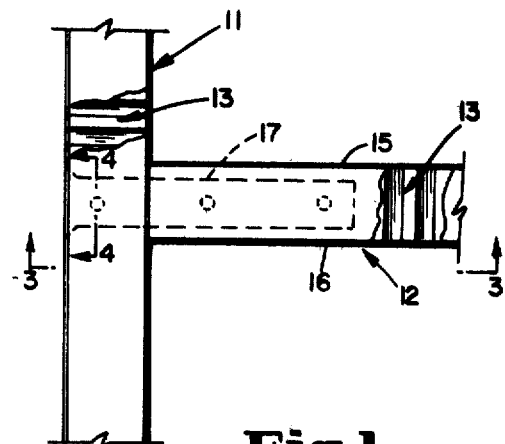
FIG. 1 is a fragmentary elevation partly broken away and in section showing a honeycomb panel assembly according to a preferred embodiment of the invention.
Figure 2:
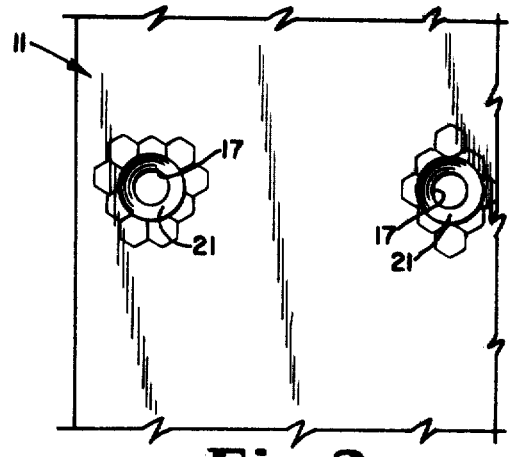
FIG. 2 is an end view of the panel assembly portion of FIG. 1.
Figure 3:
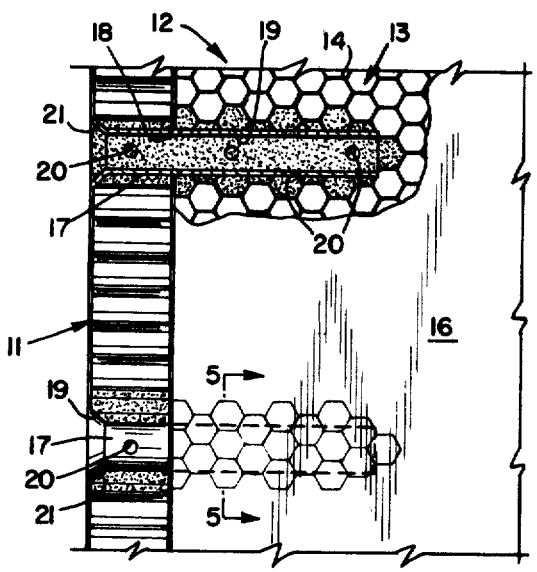
FIG. 3 is a fragmentary elevation similar to FIG. 1 but broken away and sectioned in more or other detail for better illustrating features of invention.

When the bores 18 and 19 are formed the panels 11 and 12 are placed in the position shown in FIGS. 1 and 2, and the fasteners inserted, there being a corresponding pair of aligned bores for each fastener required. Usually a jig holds the panels in assembled relation at this point. Now the fasteners 17 are inserted fully into the aligned bores, and the liquid anchoring fluid is pumped under pressure through the flared end of each fastener. This liquid will form a continuous column inside the fastener as shown and extruded branches of fluid will emerge from the open inner end of the fastener and all of the apertures 20 until it fills the spaces at the ruptured cell wall regions and around the outer side and end of fastener 17.

Pressure is maintained until increasing back pressure indicates that the regions and spaces around each fastener are occupied by the anchoring liquid. Then the pressure is relieved and the panels remain in the jig until the anchoring fluid has hardened in situ. The anchoring fluid thus becomes an integral part of the fastener since it comprises a solid column inside the tube and random size and direction solid branches extending randomly outwardly from the column through the metal tube.

The preferred anchoring fluid is any known adhesive or glue composition used in furniture which may be initially fluent at room or slightly higher temperature but will harden under the foregoing conditions.

Since the sheets 15 and 16 may be partly transparent the random distribution of the glue if darker or colored will appear in substantially Christmas tree contour, since the ruptured wall cells are filled with the glue from end to end. Also at the outer end of each fastener the adhesive may spread randomly beneath the outer sheet as indicated by the showing in FIG. 5.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of joining two composite honeycomb panels each having internal cellular structure positioned between cover sheet members, comprising the steps of providing related bores in the respective panels, at least one of said bores being a through bore extending entirely through its panel, including the respective cover sheet members, placing the panels in tightly abutting relation with the bores of the respective panels in alignment, inserting a hollow tubular fastener element having an open outer end through said through bore with its inner end projecting into and along the aligned bore, there being side apertures in said fastener located within each of said panels when the fastener is fully inserted, forcing fluent anchoring material into said fastener through said outer end under sufficient pressure that some of the material extrudes from a column within the fastener element through said apertures to randomly occupy adjacent space in the cellular structures of both panels, and allowing said anchoring fluid to harden in situ whereby to provide a combined fastener tube and hardened anchoring fluid unit to effectively anchor said fastener to both panels and secure said panels together in tight assembly.

2. The method defined in claim 1, wherein said anchoring fluid is a glue-type adhesive.

3. A permanent honeycomb panel assembly made by the method defined in claim 1.

4. Coupling means for securing together two abutting honeycomb panels each having internal cellular structure positioned between cover sheet members, comprising means providing aligned bores in the respective panels, at least one of said bores being a through bore extending entirely through its panel, including the respective cover sheet members, each bore being surrounded by regions where cell walls are ruptured to provide spaces of irregular size and location during formation of said bores, an open-ended hollow tubular fastener inserted through said bores to bridge said aligned bores, said fastener having side wall apertures that communicate with said regions in both panels and a solid column of anchoring material located within the hollow portion of said fastener, said column having branches extending through said apertures to occupy said regions.

5. The coupling defined in claim 4, wherein the fastener is a tube of a substantially uniform diameter that is larger than the diameter of the individual cells of said cellular core structure.

6. The coupling defined in claim 5, wherein said panels are of about equal thickness and the fastener is materially greater in length than the width of a panel.

7. A permanent honeycomb panel assembly joined as defined in claim 4.

8. The method of claim 1 wherein the abutting panels are mutually perpendicular.

9. The coupling means of claim 4 wherein the abutting panels are mutually perpendicular.

* * * * *